US012658789B2

(12) United States Patent
Maezaki et al.

(10) Patent No.: US 12,658,789 B2
(45) Date of Patent: *Jun. 16, 2026

(54) CHARGER, CONTROL METHOD, AND RECORDING MEDIUM

(71) Applicant: Yazaki Corporation, Tokyo (JP)

(72) Inventors: Daisuke Maezaki, Susono (JP); Michito Enomoto, Susono (JP); Ryo Gondo, Susono (JP); Yoshiya Ohnuma, Nagaoka (JP); Shohei Komeda, Tokyo (JP); Shunsuke Takuma, Nagaoka (JP)

(73) Assignee: YAZAKI CORPORATION, Tokyo (JP)

( * ) Notice: Subject to any disclaimer, the term of this patent is extended or adjusted under 35 U.S.C. 154(b) by 223 days.

This patent is subject to a terminal disclaimer.

(21) Appl. No.: 18/762,133

(22) Filed: Jul. 2, 2024

(65) Prior Publication Data

US 2025/0047197 A1 Feb. 6, 2025

(30) Foreign Application Priority Data

Aug. 1, 2023 (JP) ................................. 2023-125589

(51) Int. Cl.
    *H02M 1/42*      (2007.01)
    *H02M 3/335*      (2006.01)
(52) U.S. Cl.
    CPC ..... *H02M 1/4225* (2013.01); *H02M 3/33584* (2013.01)
(58) Field of Classification Search
    CPC ........................ H02M 1/4225; H02M 3/33584
    See application file for complete search history.

(56) References Cited

U.S. PATENT DOCUMENTS 9,450,502 B2 * 9/2016 Sakakibara ............. H02M 1/15
9,490,722 B2 * 11/2016 Sakakibara ............. H02M 5/40
(Continued)

FOREIGN PATENT DOCUMENTS

JP    2022-034820 A    3/2022
JP    2023-025795 A    2/2023

OTHER PUBLICATIONS

Murat Yilmaz et al., "Review of Battery Charger Topologies, Charging Power Levels, and Infrastructure for Plug-In Electric and Hybrid Vehicles", IEEE Transactions on Power Electronics, 2012, vol. 28, No. 5, pp. 2151-2169 (19 pages total).

(Continued)

*Primary Examiner* — Lakaisha Jackson
(74) *Attorney, Agent, or Firm* — Sughrue Mion, PLLC

(57) ABSTRACT

A charger includes a rectifier, a DC/DC converter, and a power ripple absorption circuit including, wherein a first diode is connected between an inductor of the power ripple absorption circuit and the rectifier, a second diode is connected between the inductor and the rectifier, a capacitor and a first switch are connected in series between a first line and a second line, a third diode is connected between a line connecting the capacitor and the first switch and the inductor, a second switch is connected between a line connecting the inductor and the third diode and the second line, and wherein a summation of a power output from the alternating current power supply and a power output from the capacitor is controlled to become constant, and the first switch is kept ON in a discharge period in which an instantaneous power is lower than an average power.

10 Claims, 8 Drawing Sheets

(56) References Cited

U.S. PATENT DOCUMENTS

2020/0328671 A1\* 10/2020 Li .................... H02M 3/33569
2022/0060045 A1   2/2022 Imoto et al.
2022/0224248 A1   7/2022 Sakakibara et al.

OTHER PUBLICATIONS

Komeda et al., "A Dual Active Bridge AC-DC Converter with an Active Energy Buffer", papers of Technical Meeting on Semiconductor Power Converter, 2021, SPC-21-003, pp. 13-18.
Komeda et al., "A Variable Frequency Control Method for a Dual-Active-Bridge AC-DC Converter with an Active Energy Buffer", proceedings of 2021 IEE—Japan Industry Applications Society Conference, 2021, vol. 1, No. 30, pp. 13-18.
Komeda et al., "A Variable Switching Frequency Control Method for a Dual-Active-Bridge Single-Phase AC-DC Converter with an Active Energy Buffer," 2022 International Power Electronics Conference (IPEC—Himeji 2022—ECCE Asia), 2022, pp. 1185-1190.
Komeda et al., "Variable Switching Frequency Control for a Dual-Active-Bridge Single-Phase AC-DC Converter with Active Energy Buffer," IEEJ Journal of Industry Applications, 2023, vol. 12, No. 3, pp. 418-426.
Hirachi, "Fundamentals and Applications of DC/DC Converter", Institute of Electrical Engineers of Japan, First Edition, Jan. 2018, pp. 178-193.

\* cited by examiner

FIG. 3

| | SWITCH S21 | SWITCH S22 | SWITCH S23 | SWITCH S24 | SWITCH S25 | SWITCH S26 | SWITCH S27 | SWITCH S28 | SWITCH S31 |
|---|---|---|---|---|---|---|---|---|---|
| MODE 1 | on | off | off | on | off | on | on | off | on |
| MODE 2 | on | off | off | on | on | off | off | on | on |
| MODE 3 | on | off | off | on | on | off | off | on | off |
| MODE 4 | off | on | on | off | on | off | off | on | on |
| MODE 5 | off | off | off | off | off | off | off | off | off |
| MODE 6 | off | on | on | off | off | on | on | off | off |
| MODE 7 | off | on | on | off | off | on | on | off | on |

FIG. 12

CHARGER, CONTROL METHOD, AND RECORDING MEDIUM

TECHNICAL FIELD

The present disclosure relates to a charger, a control method, and a recording medium thereof.

BACKGROUND

Various isolated single-phase AC/DC converters are being studied as chargers for electric vehicles. Generally, chargers for electric vehicles use a circuit configuration consisting of a diode rectifier with a power factor correction (PFC) circuit, a large-capacity capacitor in the DC link, and a high-frequency isolated DC/DC converter. The large-capacity capacitor in the DC link needs to have enough capacity to absorb the power ripples from the single-phase AC power supply, and with such a circuit configuration, downsizing has been difficult.

As a small charger capable of absorbing power ripples, the Patent Document 1 and the Non-Patent Document 1 describe chargers with active buffers for absorbing power ripple added to Dual-Active-Bridge (DAB) converters and the control thereof.

In the control disclosed in Patent Document 1 and Non-Patent Document 1 (discontinuous current mode), there is a period (zero current period) in which all switches of the DAB converter are turned off. Therefore, the number of times of switching is large, and the switching loss increases. Also, during this zero current period, all switches are off, so the current flowing through an inductor L of the DAB converter should be zero, but in reality there is a lag in the timing at which the switches turn off, and due to this lag, a current remains, causing resonance between the inductor L of a DC/DC converter 120 and the parasitic capacitance of switches S21 to S28. Therefore, switching after the zero current period becomes hard switching, and switching loss occurs.

Patent Document 2 and Non-Patent Documents 2 to 4 disclose control in which there is no zero current period (continuous current mode). In continuous current mode, a switching frequency $f_{SW}$ of the switches S21 to S28 of the DC/DC converter 120 and a first switch S31 of a power ripple absorption circuit 130 is varied during one cycle of the AC voltage input from the AC power supply, so that the zero current period becomes zero, and oscillation in the current and voltage of the inductor L are removed, thus avoiding hard switching after the zero current period, making it possible to control the charger with high efficiency.

RELATED ART

Patent Documents

[Patent Document 1] JP2022034820 (A)
[Patent Document 2] JP2023025795 (A)

Non-Patent Documents

Non-Patent Document 1: Shohei Komeda, Yoshiya Ohnuma, "A Dual Active Bridge AC-DC Converter with an Active Energy Buffer", papers of Technical Meeting on Semiconductor Power Converter, 2021, SPC-21-003, pp. 13-18
Non-Patent Document 2: Shohei Komeda, Shunsuke Takuma. Yoshiya Ohnuma, "A Variable Frequency Control Method for a Dual-Active-Bridge AC-DC Converter with an Active Energy Buffer", proceedings of 2021 IEE-Japan Industry Applications Society Conference, 2021, Vol. 1, No. 30, pp. 13-18
Non-Patent Document 3: S. Komeda, S. Takuma and Y. Ohnuma, "A Variable Switching Frequency Control Method for a Dual-Active-Bridge Single-Phase AC-DC Converter with an Active Energy Buffer," 2022 International Power Electronics Conference (IPEC-Himeji 2022-ECCE Asia), 2022, pp. 1185-1190
Non-Patent Document 4: S. Komeda, S. Takuma and Y. Ohnuma, "Variable Switching Frequency Control for a Dual-Active-Bridge Single-Phase AC-DC Converter with Active Energy Buffer," IEEJ Journal of Ind. Appl., vol. 12, no. 3, pp. 418-426 (2023)

SUMMARY OF THE INVENTION

Problem to be Solved by the Invention

In all of the above controls, the operating waveform of an inductor L of the DC/DC converter 120 is made asymmetric between positive and negative, and this asymmetrical operating waveform is approximated by a square waveform, thereby facilitating derivation of the control law. In order to make the operating waveform of the inductor L asymmetric between positive and negative, the above control requires to switch the discharge switch of the active buffer twice or more within a switching cycle, in either the discharge period in which the buffer capacitor of the active buffer is discharged or the charging period in which the buffer capacitor of the active buffer is charged. As a result, in the above control, the switching loss in the discharge switch of the active buffer affects the efficiency of the charger.

Therefore, it is an object of the present invention to provide a small and highly efficient charger that can absorb power ripples.

Solution to Problem

In order to solve the above object, a charger according to an aspect of the present disclosure includes:

a rectifier including two input terminals connecting to an alternating current power supply, a cathode terminal, and an anode terminal;

a DC/DC converter including a first terminal connecting to the cathode terminal of the rectifier via a first line, a second terminal connecting to the anode terminal of the rectifier via a second line, a third terminal connecting to a positive electrode of a battery, and a fourth terminal connecting a negative electrode of the battery;

a power ripple absorption circuit including a first diode, a second diode, a third diode, an inductor, a capacitor, a first switch, and a second switch; and a control unit configured to control switching of switches of the DC/DC converter, the first switch, and the second switch, wherein the first diode is connected between the inductor of the power ripple absorption circuit and one of the two input terminals of the rectifier, the second diode is connected between the inductor and the other of the two input terminals of the rectifier, the capacitor and the first switch are connected in series between the first line and the second line, with the capacitor being disposed on a side of the second line,

the third diode is connected between a line connecting the capacitor and the first switch and the inductor of the power ripple absorption circuit, the second switch is connected between a line connecting the inductor and the third diode of the power ripple absorption circuit and the second line, and wherein the control unit controls the DC/DC converter, the first switch, and the second switch such that a summation of a power output from the alternating current power supply and a power output from the capacitor becomes constant, and the control unit keeps the first switch in an ON state in a discharge period that is a period in which an instantaneous power output from the alternating current power supply is lower than an average power of the power output from the alternating current power supply.

A control method according to an aspect of the present disclosure is a control method executed by a computer to control a charger, wherein the charger includes:

a rectifier including two input terminals connecting to an alternating current power supply, a cathode terminal, and an anode terminal;

a DC/DC converter including a first terminal connecting to the cathode terminal of the rectifier via a first line, a second terminal connecting to the anode terminal of the rectifier via a second line, a third terminal connecting to a positive electrode of a battery, and a fourth terminal connecting a negative electrode of the battery; and a power ripple absorption circuit including a first diode, a second diode, a third diode, an inductor, a capacitor, a first switch, and a second switch; and wherein the first diode is connected between the inductor of the power ripple absorption circuit and one of the two input terminals of the rectifier, the second diode is connected between the inductor and the other of the two input terminals of the rectifier, the capacitor and the first switch are connected in series between the first line and the second line, with the capacitor being disposed on a side of the second line, the third diode is connected between a line connecting the capacitor and the first switch and the inductor of the power ripple absorption circuit, the second switch is connected between a line connecting the inductor and the third diode of the power ripple absorption circuit and the second line, and wherein the control method includes:

controlling the DC/DC converter, the first switch, and the second switch such that a summation of a power output from the alternating current power supply and a power output from the capacitor becomes constant, and keeping the first switch in an ON state in a discharge period that is a period in which an instantaneous power output from the alternating current power supply is lower than an average power of the power output from the alternating current power supply.

A recording medium recorded with a control program according to an aspect of the present disclosure causes a computer to execute the above control method.

Advantageous Effects of the Invention

According to an aspect of the present disclosure, a small and highly efficient charger that can absorb power ripples can be provided.

4

BRIEF DESCRIPTION OF THE DRAWINGS

FIG. 3 is a diagram illustrating the state of each switch in each mode.

FIG. 12 is a diagram illustrating an example of the efficiency of the charger 100 when operated using the symmetric waveform control method and the efficiency of the charger 100 when operated using the asymmetric waveform control method.

DETAILED DESCRIPTION OF THE EXEMPLARY EMBODIMENT

<Charger 100>

Figure 1:
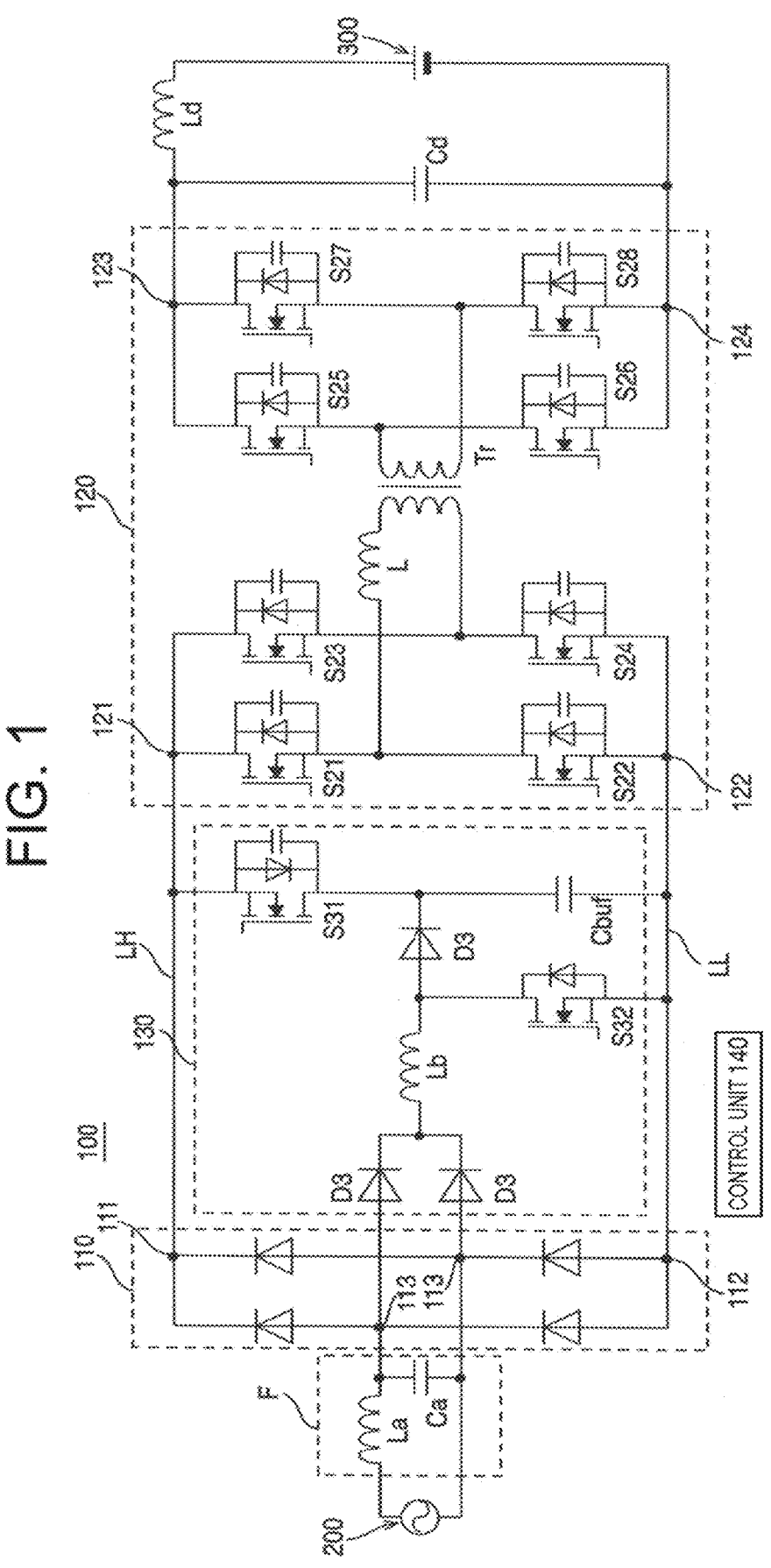
FIG. 1 is a diagram illustrating a charger 100 according to an embodiment of the present invention.

FIG. 1 is a diagram illustrating a charger 100 according to an embodiment of the present invention. The charger 100 includes a rectifier 110, a DC/DC converter 120, a power ripple absorption circuit 130, and a control unit 140. The charger 100 converts a single-phase alternating current voltage $V_S$ input from the single-phase alternating current power supply 200 into a DC voltage $V_{dc}$, and outputs the DC voltage $V_{dc}$ to the battery 300.

The rectifier 110 has a cathode terminal 111 and an anode terminal 112 connected to the DC/DC converter 120, and has two input terminals 113 for connecting to an alternating current power supply 200. The rectifier 110 is, for example, a bridge diode rectifier consisting of four diodes, as illustrated in FIG. 1, configured to convert the alternating current input from two input terminals 113 connected to the alternating current power supply into direct current, and output from cathode terminal 111. The rectifier 110 may be connected to the alternating current power supply 200 via a filter F having an inductor Lac and a capacitor Cac, as illustrated in FIG. 1.

The DC/DC converter 120 is, for example, a DAB (Dual Active Bridge) converter. The DC/DC converter 120 includes a first terminal 121 connected to the cathode terminal 111 of the rectifier 110, a second terminal 122 connected to the anode terminal 112 of the rectifier 110, a third terminal 123 for connecting to the positive terminal of battery 300, and a fourth terminal 124 for connecting to the negative terminal of battery 300. The DC/DC converter 120 includes: a transformer Tr: a full-bridge circuit including four switches on an input side (primary side), i.e., a first switch S21, a second switch S22, a third switch S23, and a fourth switch S24; and a full-bridge circuit including four switches on an output side (secondary side), i.e., a fifth switch S25, a sixth switch S26, a seventh switch S27, and an eighth switch S28, with the transformer Tr interposed therebetween. Each of the eight switches S21 to S28 is, for example, an N-channel power MOSFET (Metal-Oxide-Semiconductor Field-Effect Transistor) having a reverse polarity diode (body diode). In this case, the N-channel power MOSFET may have a snubber capacitor.

The full-bridge circuit on the primary side of the DC/DC converter 120 includes two legs connected between the first terminal 121 and the second terminal 122 (a leg including the first switch S21 arranged on the side of the first terminal 121 and the second switch 22 arranged on the side of the second terminal 122; and a leg including the third switch S23 arranged on the side of the first terminal 121 and the fourth switch S24 arranged on the side of the second terminal 122), and the full-bridge circuit on the secondary side of the DC/DC converter 120 includes two legs connected between the third terminal 123 and the fourth terminal 124 (a leg including the fifth switch S25 arranged on the side of the third terminal 123 and the sixth switch 26 arranged on the side of the fourth terminal 124; and a leg including the seventh switch S27 arranged on the side of the third terminal 123 and the eighth switch S28 arranged on the side of the fourth terminal 124).

The DC/DC converter 120 includes the inductor L on the primary side of the transformer Tr. This inductor L is, for example, a leakage inductor of the transformer Tr.

Furthermore, a direct current capacitor Cdc is connected between the third terminal 123 and the fourth terminal 124 of the DC/DC converter 120. An inductor Ldc may be connected between the third terminal 123 of the DC/DC converter 120 and the positive electrode of the battery 300.

The power ripple absorption circuit 130 includes a first diode D31, a second diode D32, a third diode D33, an inductor Lb, a buffer capacitor $C_{buf}$, a first switch S31, and a second switch S32.

The first diode D31 of the power ripple absorption circuit 130 is connected between the inductor Lb of the power ripple absorption circuit 130 and one of the two input terminals 113 of the rectifier 110, and the second diode D32 of the power ripple absorption circuit 130 is connected between the inductor Lb of the power ripple absorption circuit 130 and the other of the two input terminals 113 of the rectifier 110. In this case, each the first diode D31 and the second diode D32 of the power ripple absorption circuit 130 is connected between the inductor Lb of the power ripple absorption circuit 130 and the input terminal 113 of the rectifier 110 such that the direction from the input terminal 113 of the rectifier 110 to the inductor Lb is the forward direction. Accordingly, even when the alternating current power supply 200 is connected to the input terminal 113 of the rectifier 110, a direct current is input to the inductor Lb of the power ripple absorption circuit 130.

The buffer capacitor $C_{buf}$ and the first switch S31 of the power ripple absorption circuit 130 are connected in series between a first line LH connecting between the cathode terminal 111 of the rectifier 110 and the first terminal 121 of the DC/DC converter 120 and a second line LL connecting between the anode terminal 112 of the rectifier 110 and the second terminal 122 of the DC/DC converter 120. The buffer capacitor $C_{buf}$ is arranged on the side of the second line LL, and the first switch 31 is arranged on the side of the first line LH. The first switch S31 is, for example, an N-channel power MOSFET (Metal-Oxide-Semiconductor Field-Effect Transistor) having a reverse polarity diode (body diode). In this case, the source of the N-channel power MOSFET may be connected to the first line LH, and the drain of the N-channel power MOSFET may be connected to the buffer capacitor.

In this case, the third diode D33 of the power ripple absorption circuit 130 is connected between: a line connecting the buffer capacitor $C_{buf}$ and the first switch S31 of the power ripple absorption circuit 130; and the inductor Lb of the power ripple absorption circuit 130, such that the direction from the inductor Lb to this line is the forward direction.

The second switch S32 of the power ripple absorption circuit 130 is connected between: a line connecting the inductor Lb and the third diode D33 of the power ripple absorption circuit 130; and the second line LL. The second switch S32 is, for example, an N-channel power MOSFET (Metal-Oxide-Semiconductor Field-Effect Transistor) having a reverse polarity diode (body diode). In this case, the drain of the N-channel power MOSFET may be connected to a line connecting the inductor Lb and the third diode D33 of the power ripple absorption circuit 130, and the source of the N-channel power MOSFET may be connected to the second line LL.

The control unit 140 controls switching of the switches S21 to S28 of the DC/DC converter 120 and the switches S31 and S32 of the power ripple absorption circuit 130. The control unit 140 is constituted by, for example, a computer.

The power ripple absorption circuit 130 includes a first diode D31, a second diode D32, a third diode D33, an inductor Lb, a buffer capacitor $C_{buf}$, and a second switch S32, and therefore, can function as a power factor correction circuit (PFC). Therefore, in the present embodiment, control can be performed so that a sinusoidal voltage $V_S$ and a sinusoidal current iS described below are input from the alternating current power supply 200 to the charger 100.

[Math 1]

$$v_S(t) = \sqrt{2}\, V_S \sin\omega_S t$$

$$i_S(t) = \sqrt{2}\, I_S \sin\omega_S t$$

$V_S$ denotes an effective value of the power supply voltage, and IS denotes an effective value of the power supply current.

Figure 2:
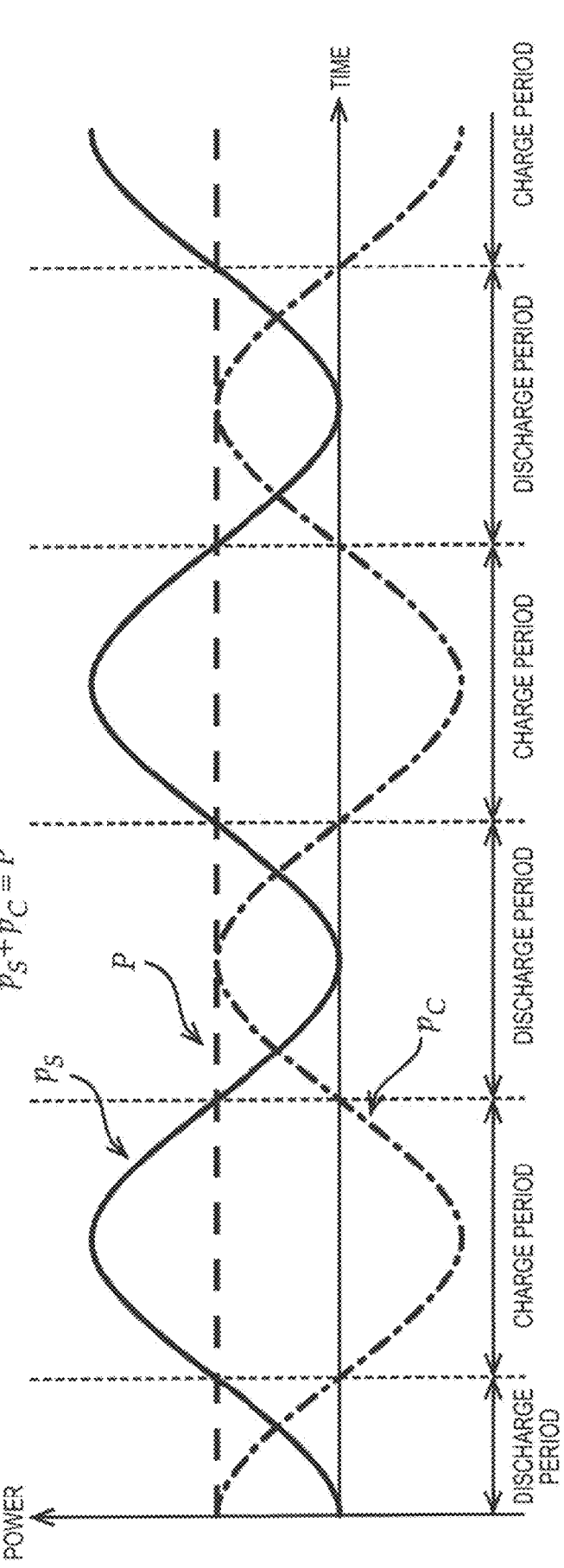
FIG. 2 is a diagram illustrating a relationship between an instantaneous power $p_s$ output from an alternating current power supply and an instantaneous power $p_C$ output from a buffer capacitor $C_{buf}$.

In this case, as described below, the instantaneous power $p_S$ output from the alternating current power supply 200 is a summation of an average power P $(=V_S I_S)$ and a ripple portion $p_{rip}(t)(=-V_S I_S \cos 2\omega_S t)$, and as indicated by a solid line in FIG. 2, the instantaneous power $p_S$ pulsates at an angular frequency twice the angular frequency $\omega_S$ of the alternating current, with respect to the average power P (dashed line in FIG. 2).

$$p_S(t) = v_S i_S = V_S I_S (1 - \cos 2\omega_S t) = P + p_{rip}(t)$$

Accordingly, the control unit 140 controls switching of the switches S21 to S28 of the DC/DC converter 120 and the switches S31 and S32 of the power ripple absorption circuit 130 so that the power ripple absorption circuit 130 absorbs the ripple of the power due to the alternating current power supply 200 to make the power input to DC/DC converter 120 constant.

In this case, the charger 100 according to the present embodiment changes control between when the instantaneous power $p_S$ output from the alternating current power supply 200 is higher than the average power P ($p_s$>P) and when the instantaneous power $p_S$ output from the alternating current power supply 200 is lower than the average power P ($p_s$<P).

When the instantaneous power $p_S$ output from the alternating current power supply 200 is higher than the average power P ($p_s$>P), switching of the eight switches S21 to S28 of the DC/DC converter 120 and the two switches S31 and S32 of the power ripple absorption circuit 130 are controlled to supply the ripple portion $p_{rip}$ of the instantaneous power $p_S$ output from the alternating current power supply 200 to the buffer capacitor $C_{buf}$ via the inductor Lb of the power ripple absorption circuit 130 to charge the buffer capacitor $C_{buf}$, so that only the average power P of the power output from the alternating current power supply is supplied to the DC/DC converter 120. In other words, in the present embodiment, the period in which the instantaneous power $p_S$ output from the alternating current power supply 200 is higher than the average power P is a period in which the buffer capacitor $C_{buf}$ is charged (charge period), and the instantaneous power $p_C$ output from the buffer capacitor Cbuf becomes minus as indicated by a long dashed short dashed line of FIG. 2.

In contrast, when the instantaneous power $p_S$ output from the alternating current power supply 200 is lower than the average power P ($p_s$<P), switching of the eight switches S21 to S28 of the DC/DC converter 120 and the first switches S31 and S32 of the power ripple absorption circuit 130 are controlled to actively discharge the buffer capacitor $C_{buf}$ via the first switch S31 to compensate for the ripple portion $p_{rip}$, which is the difference between the instantaneous power $p_S$ output from the alternating current power supply 200 and the average power P, so that the average power P is supplied to the DC/DC converter 120. Specifically, in the present embodiment, the period in which the instantaneous power $p_S$ output from the alternating current power supply 200 is lower than the average power P is a period in which the buffer capacitor $C_{buf}$ is discharged (discharge period), and the instantaneous power $p_C$ output from the buffer capacitor Cbuf becomes plus as indicated by the long dashed short dashed line of FIG. 2.

As described above, in the present embodiment, the control unit 140 controls switching of the switches S21 to S28 of the DC/DC converter 120 and the switches S31 and 32 of the power ripple absorption circuit 130 so that a summation of the instantaneous power $p_S$ output from the alternating current power supply 200 and the instantaneous power $p_C$ output from the buffer capacitor Cbuf becomes constant.

As described above, in the present embodiment, in discharge period, the buffer capacitor $C_{buf}$ is actively discharged. Therefore, in the present embodiment, the amount of power accumulated in the buffer capacitor $C_{buf}$ (i.e., the capacity of the buffer capacitor $C_{buf}$) can be reduced, and the buffer capacitor $C_{buf}$ can be downsized.

In addition, in the present embodiment, there is no ripple in the power input to the DC/DC converter 120. Accordingly, in the present embodiment, the transformer Tr of the DC/DC converter 120 and the direct current capacitor Cdc can be downsized.

As described above, in the present embodiment, passive elements such as the capacitor, the inductors, and the transformer can be downsized. Therefore, in the present embodiment, the small charger capable of absorbing power ripples can be provided.

<Asymmetric Waveform Control Method>

The control unit 140 controls, according to seven modes or six modes, switching of the switches S21 to S28 of the DC/DC converter 120 and the first switch S31 of the power ripple absorption circuit 130, so that, for example, the operating waveform $i_L$ of the inductor L of the DC/DC converter 120 becomes asymmetric between positive and negative (asymmetric waveform control method). FIG. 3 is a diagram illustrating the state of each switch in the seven modes. The seven modes include a mode (mode 5) in which all of the switches S21 to S28 of the DC/DC converter 120 and the first switch S31 of the power ripple absorption circuit 130 are in the OFF state.

Figure 4:
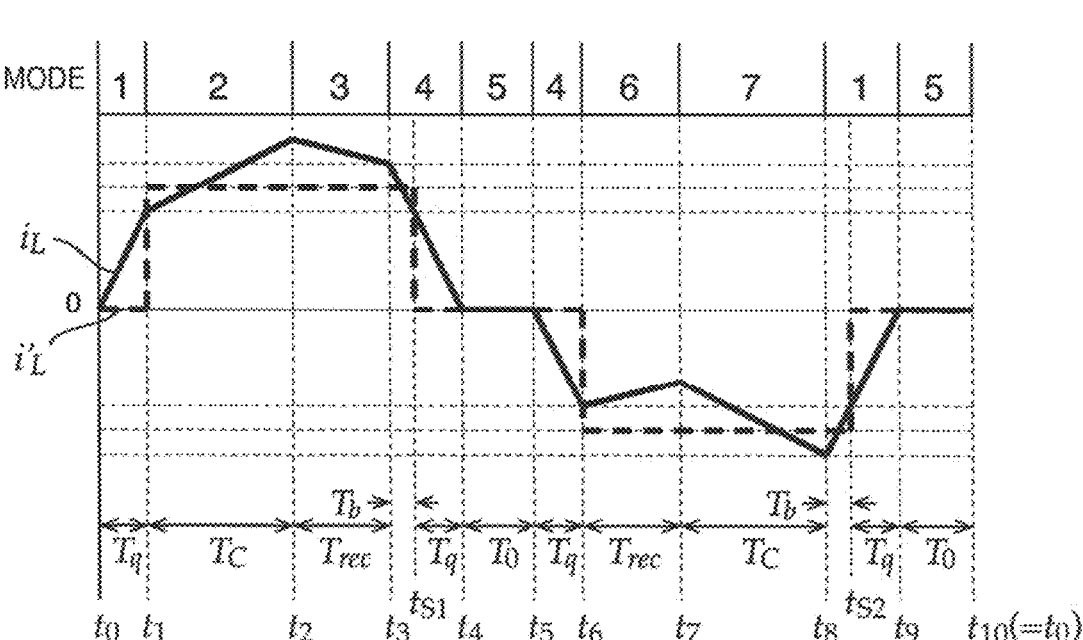
FIG. 4 is a diagram illustrating an operating waveform $i_L$ of an inductor L of a DC/DC converter 120 and its equivalent square wave $i_L'$ in a discontinuous current mode (asymmetric waveform control method).
Figure 5:
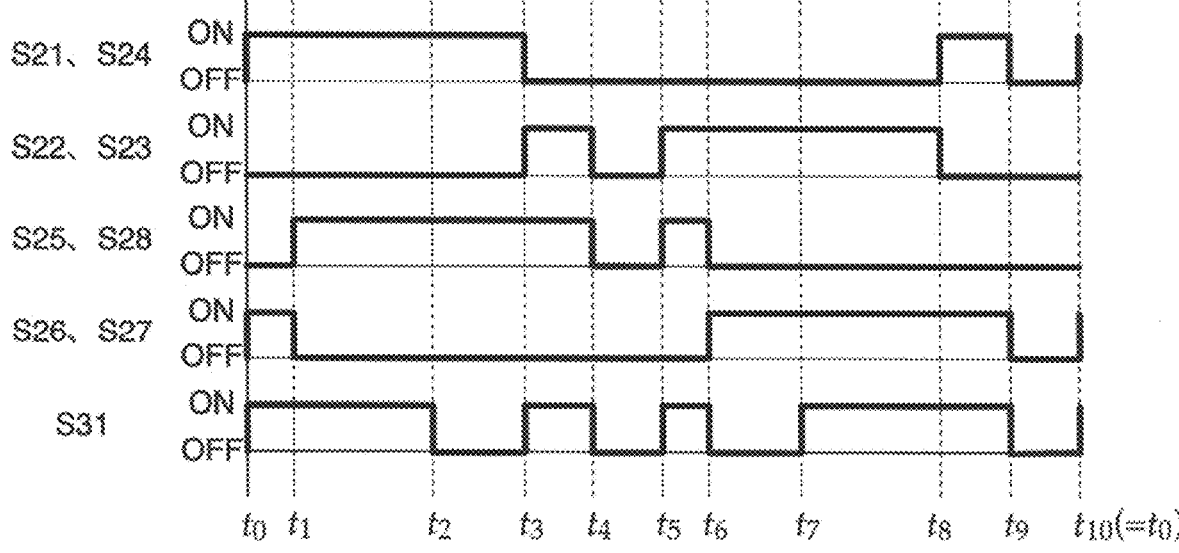
FIG. 5 is a diagram illustrating switching of switches S21 to S28 of the DC/DC converter 120 and a first switch S31 of a power ripple absorption circuit 130 in the discontinuous current mode (asymmetric waveform control method).

FIG. 4 is a diagram illustrating the operating waveform $i_L$ of the inductor L of the DC/DC converter 120 in a discontinuous current mode including a zero current period TO in which a current $i_L$ flowing through the reactor L becomes zero (asymmetric waveform control method). The operating waveform $i_L$ of this discontinuous current mode can be obtained by switching the seven modes illustrated in FIG. 3 in the order of mode 1, mode 2, mode 3, mode 4, mode 5, mode 4, mode 6, mode 7, mode 1, and mode 5, as illustrated in FIG. 5. In this case, the current $i_L$ in each of the seven modes is as follows (Patent Document 1, Non-Patent Document 1).

$$(1)$$

$$i_L(t) = \begin{cases} \dfrac{v_C + V_{dc}}{L}(t - t_{c1}) + i_L(t_{c1}) & \text{(Mode 1)} \\[2mm] \dfrac{v_C - V_{dc}}{L}(t - t_{c2}) + i_L(t_{c2}) & \text{(Mode 2)} \\[2mm] \dfrac{v_{rec} - V_{dc}}{L}(t - t_{c3}) + i_L(t_{c3}) & \text{(Mode 3)} \\[2mm] -\dfrac{v_C + V_{dc}}{L}(t - t_{c4}) + i_L(t_{c4}) & \text{(Mode 4)} \\[2mm] 0 & \text{(Mode 5)} \\[2mm] -\dfrac{v_{rec} - V_{dc}}{L}(t - t_{c6}) + i_L(t_{c6}) & \text{(Mode 6)} \\[2mm] -\dfrac{v_C - V_{dc}}{L}(t - t_{c7}) + i_L(t_{c7}) & \text{(Mode 7)} \end{cases}$$

In this case, $t_{en}$ (n=1 to 7) is a time at which the mode is switched to the mode n.

In the present embodiment, in order to actively discharge the buffer capacitor $C_{buf}$ when the first switch S31 of the power ripple absorption circuit 130 is in the ON state, the control unit 140 controls the voltage $v_C$ applied to the buffer capacitor $C_{buf}$ so that the voltage $v_C$ applied to the buffer capacitor $C_{buf}$ is always higher than the instantaneous voltage $v_{rec}$ output from the rectifier 110. Therefore, in the present embodiment, the voltage $v_C$ applied to the buffer capacitor $C_{buf}$ has a value different from the instantaneous voltage $v_{rec}$ of the rectifier 110, and the inclination of the operating waveform $i_L$ is different between the mode 2 and the mode 3. Likewise, the inclination of the operating waveform $i_L$ is different between the mode 6 and the mode 7. Therefore, in the present embodiment, as illustrated in FIG. 4, an operating waveform of which the positive waveform and the negative waveform are asymmetric with respect to $i_L=0$ can be generated.

Where, in the operating waveform $i_L$ as illustrated in FIGS. 4, $t_0$ to $t_10$ are set so that $|t_0-t_1|=|t_5-t_6|$, $|t_1-t_2|=|t_7-t_8|$, $|t_2-t_3|=|t_6-t_7|$, $|t_3-t_4|=[t_8-t_9|$ hold and $t_{S1}$ is set between $t_3$ and $t_4$ and $t_{S2}$ is set between $t_8$ and $t_9$ so that $|t_0-t_1|=|t_{S1}-t_4|]=|t_{S2}-t_9|$ hold, the operating waveform $i_L$ can be approximated by the equivalent square waveform $i_L'$.

$$i_L'(t) = \begin{cases} \dfrac{i_L(t_1) + i_L(t_3)}{2} = I_L' & (t_1 \le t \le t_{S1}) \\ -I_L' & (t_6 \le t \le t_{S2}) \\ 0 & (t_0 \le t < t_1, t_{S1} < t < t_6, t_{S2} < t < t_{10}) \end{cases}$$

Where, in the equivalent square waveform $i_L'$, periods of $t_0 \le t < t_1$, $t_{S1} \le t < t_4$, $t_5 \le t < t_6$, and $t_{S2} \le t < t_9$ are defined as a reactive current period $T_q$, periods of $t_1 \le t < t_2$ and $t_7 \le t < t_8$ are defined as a buffer capacitor discharge current period $T_C$, periods of $t_2 \le t < t_3$ and $t_6 \le t < t_7$ are defined as a power supply current period $T_{rec}$, periods of $t_3 \le t < t_{S1}$ and $t_8 \le t < t_{S2}$ are defined as a current balance period Tb, and periods of $t_4 \le t < t_5$ and $t_9 \le t < t_10$ are defined as a zero current period T0, the duty ratio of each period of the switching cycle $T_{SW}$ is as follows.

$$\begin{cases} D_q = \dfrac{2T_q}{T_{SW}} = \dfrac{2I_L'L}{(v_C + V_{dc})T_{SW}} - \dfrac{D_b}{2} & (2) \\ D_C = \dfrac{2T_C}{T_{SW}} = \dfrac{i_C}{I_L'} + D_b = \dfrac{(v_{rec} - V_{dc})i_{rec} + (v_C + V_{dc})i_C}{2V_{dc}I_L'} \\ D_{rec} = \dfrac{2T_{rec}}{T_{SW}} = \dfrac{i_{rec}}{I_L'} \\ D_b = \dfrac{2T_b}{T_{SW}} = \dfrac{(v_{rec} - V_{dc})i_{rec} + (v_C - V_{dc})i_C}{2V_{dc}I_L'} \\ D_0 = \dfrac{2T_0}{T_{SW}} = 1 - (2D_q + D_C + D_{rec} + D_b) \end{cases}$$

By giving $i_{rec}$, $i_C$, $v_C$, $V_{dc}$, and $I_L'$ as command values, the duty ratio of each period can be obtained. By using the duty ratio of each period thus obtained, the control law for the operating waveform $i_L$ in FIG. 4 can be derived. Among these command values, command values $i_{rec}^*$, $i_C^*$ for $i_{rec}$ and $i_C$ are switched between the discharge period and the charge period as follows, so that the power ripple absorption circuit 130 functions as a PFC circuit, and serves as a circuit for absorbing power rippled.

$$i_{rec}^* = \begin{cases} \sqrt{2}\dfrac{P}{V_S}|\sin\omega_S t| & \text{(discharge period)} \\ \dfrac{P}{\sqrt{2}\,V_S|\sin\omega_S t|} & \text{(charge period)} \end{cases}$$

$$i_C^* = \begin{cases} \dfrac{P}{v_C}\cos 2\omega_S t & \text{(discharge period)} \\ 0 & \text{(charge period)} \end{cases}$$

The operating waveform $i_L$ of the discontinuous current mode can be obtained by switching, at a constant switching frequency $f_{SW}$, the switches S21 to S28 of the DC/DC converter 120 and the first switch S31 of the power ripple absorption circuit 130, without changing the switching frequency $f_{SW}$ of the DC/DC converter 120. By changing the switching frequency $f_{SW}$, an operation in the continuous current mode in which there is no zero current period $T_0$ can be performed (Non-Patent Documents 2 to 4). By solving the above expression (2) with $D_0=0$, the switching frequency $f_{SW}$ in continuous current mode can be found as follows.

$$f_{SW} = \frac{v_C + V_{dc}}{4I_L'L}(1 - D_{rec} - D_C)$$ [Math 7]

Figure 6:
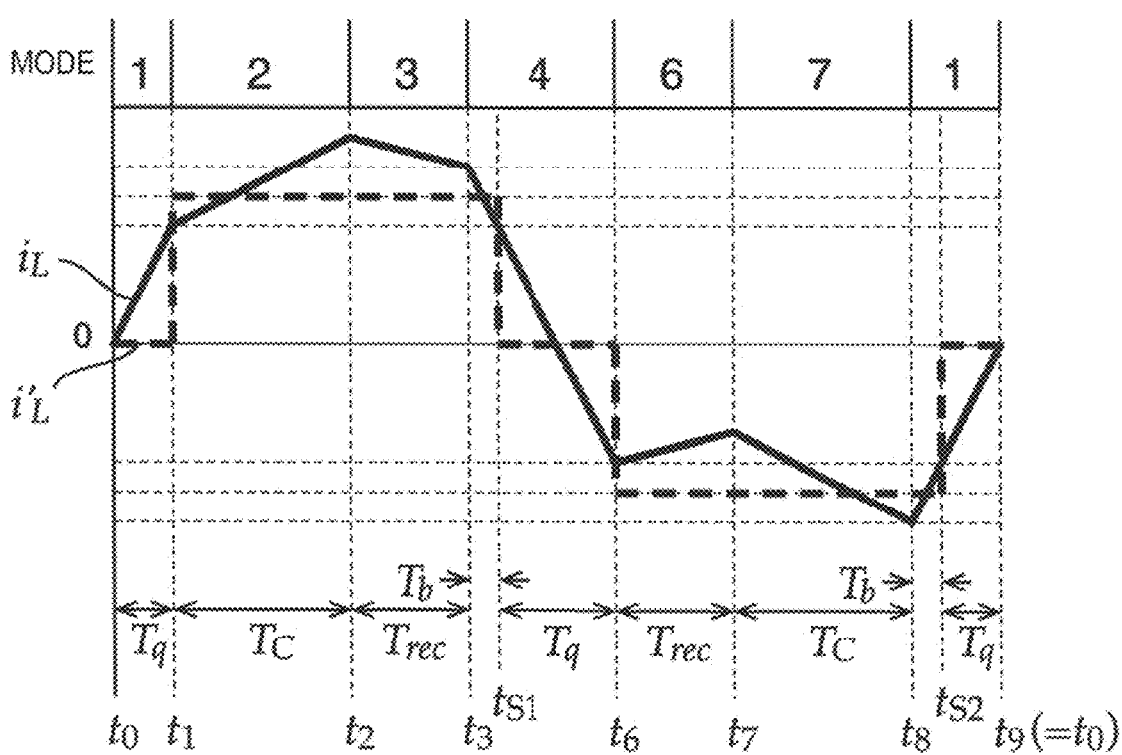
FIG. 6 is a diagram illustrating an operating waveform $i_L$ of the inductor L of the DC/DC converter 120 and its equivalent square wave $i_L'$ in a continuous current mode (asymmetric waveform control method).
Figure 7:
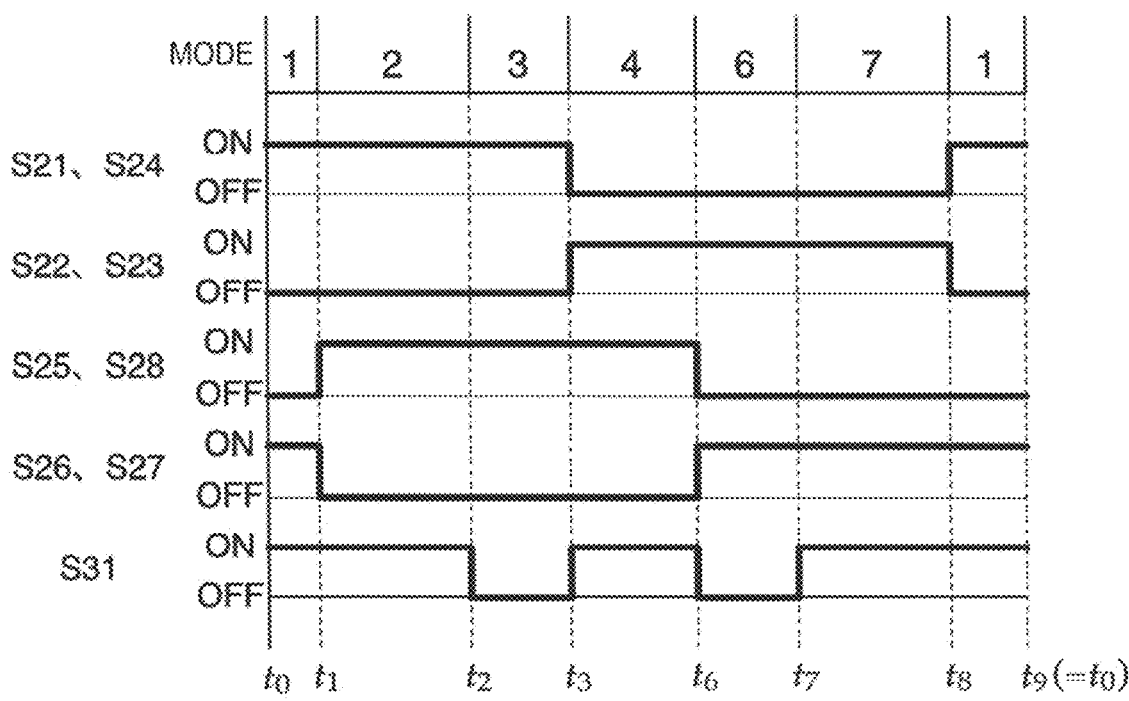
FIG. 7 is a diagram illustrating switching of switches S21 to S28 of the DC/DC converter 120 and the first switch S31 of the power ripple absorption circuit 130 in the continuous current mode (asymmetric waveform control method).

FIG. 6 is a diagram illustrating the operating waveform $i_L$ of the inductor L of the DC/DC converter 120 and its equivalent square wave $i_L'$ in the continuous current mode. In the continuous current mode, there is no operation in the mode 5, and accordingly, as illustrated in FIG. 7, the switches S21 to S28 of the DC/DC converter 120 and the first switch S31 of the power ripple absorption circuit 130 are switched in the order of mode 1, mode 2, mode 3, mode 4, mode 6, mode 7, and mode 1.

The charger 100 can be operated with a higher efficiency by optimizing the command value for a wave height $I_L'$ of the equivalent square wave $i_L'$ (Non-Patent Documents 2 to 4). For example, when the command value for the wave height $I_L'$ of the equivalent square waveform $i_L'$ is controlled so that the switching frequency $f_{SW}$ (the above expression (3)) when the phase $\omega_S t$ of the alternating current power supply voltage $V_S$ is 45 degrees becomes a predetermined value (first frequency value) $f_1$, the charger 100 can be operated with a higher efficiently. In this case, the command value $I_L'^*$ of the wave height $I_L'$ of the equivalent square waveform $i_L'$ is as follows.

$$I_L'^* = \frac{V_{dc} + V_{Cmin}}{8f_1 L}\left[1 - \sqrt{1 - \frac{8f_1 L I_S(V_s + V_{dc})}{V_{dc}(V_{dc} + V_{Cmin})}}\right]$$

$$V_{Cmin} = \sqrt{V_{Cmax}^2 - \frac{2P}{\omega_S C_{buf}}}$$

In this case, $V_{Cmin}$ denotes a minimum value of the voltage applied to the buffer capacitor $C_{buf}$.

\<Symmetric Waveform Control Method\>

In the asymmetric waveform control method, in order to make the operating waveform $i_L$ asymmetric between positive and negative, it is necessary to switch the first switch S31 of the power ripple absorption circuit 130 as illustrated in FIGS. 5 and 7, even in the discharge period. Accordingly, in the asymmetric waveform control method, switching loss of the first switch S31 occurs, even in the discharge period.

Accordingly, the control unit 140 may control switching of the switches S21 to S28 of the DC/DC converter 120 and the first switch S31 of the power ripple absorption circuit 130 so that the operating waveform $i_L$ of the inductor L of the DC/DC converter 120 becomes symmetric between positive and negative (symmetric waveform control method).

Figure 8:
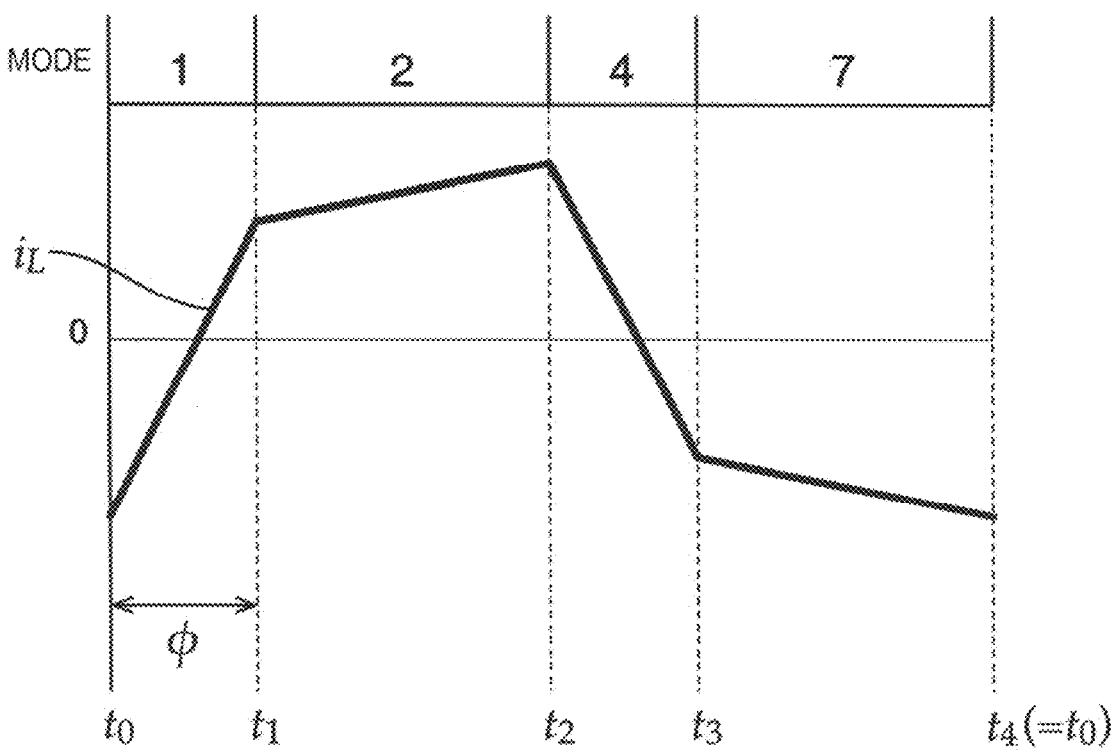
FIG. 8 is a diagram illustrating the operating waveform $i_L$ of the inductor L of the DC/DC converter 120 in a discharge period (symmetric waveform control method).
Figure 9:
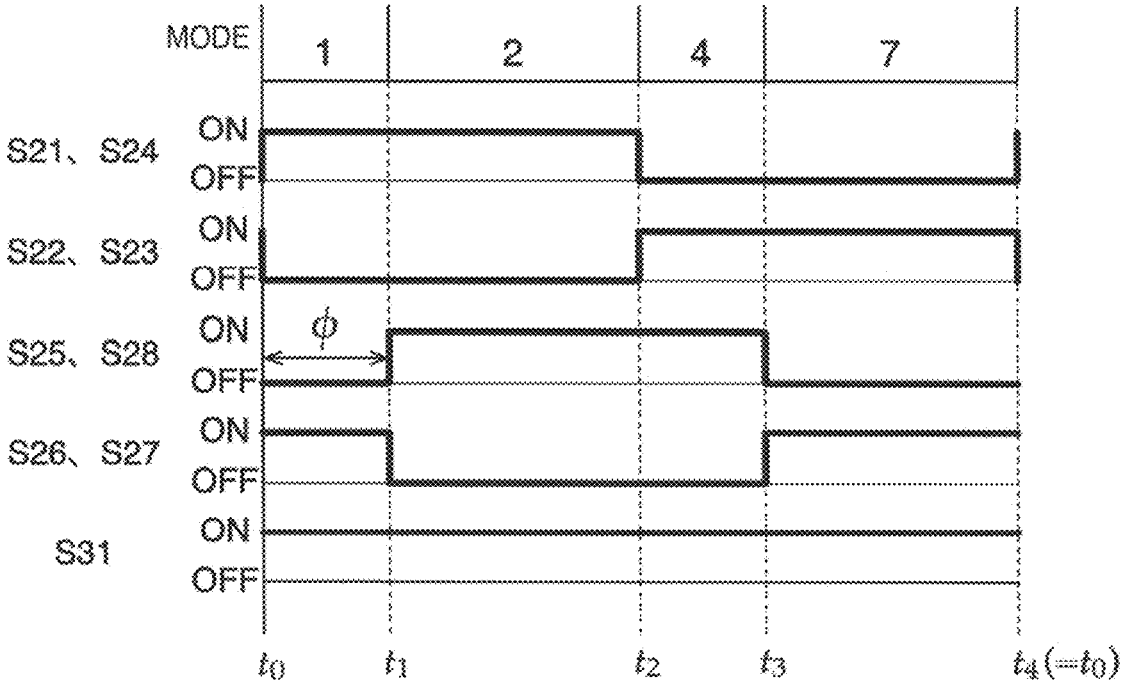
FIG. 9 is a diagram illustrating switching of switches S21 to S28 of the DC/DC converter 120 and the first switch S31 of the power ripple absorption circuit 130 in the discharge period (symmetric waveform control method).

For example, in the discharge period, the control unit 140 controls switching of the switches S21 to S28 of the DC/DC converter 120, so that the operating waveform $i_L$ of the inductor L of the DC/DC converter 120 becomes symmetric between positive and negative while the ON state of the first switch S31 of the power ripple absorption circuit 130 is maintained. FIG. 8 is a diagram illustrating the operating waveform $i_L$ of the inductor L of the DC/DC converter 120 in the discharge period. This operating waveform $i_L$ can be obtained by switching four modes (mode 1, 2, 4, and 7) of the seven modes illustrated in FIG. 3 in the order of mode 1, mode 2, mode 4, and mode 7 as illustrated in FIG. 9. Specifically, the operating waveform ix in the discharge period illustrated in FIG. 8 can be obtained by shifting, by a phase shift angle φ, an ON/OFF control of the switches S21 to S24 on the primary side and an ON/OFF control of the switches S25 to S28 on the secondary side of the DC/DC converter 120, similar to a generally-available control method of a DAB converter (for example, Katsuya Hirachi, "Fundamentals and Application of DC/DC Converter", first edition, the Institute of Electrical Engineers of Japan, January 2018, p. 178-193).

Therefore, similar to the generally-available control method of the DAB converter, the transmission power P of the DC/DC converter 120 in the discharge period can be controlled by the phase shift angle φ.

$$P = \frac{v_C V_{dc}}{2\pi f_{SW} L} \phi \left( 1 - \frac{\phi}{\pi} \right)$$

By making the output current Idc(=P/V$_{dc}$) of the DC/DC converter 120 constant, the command value φ* of the phase shift angle φ in the discharge period can be derived as follows.

$$\phi^* = \frac{\pi}{2} \left( 1 - \sqrt{1 - \frac{8 f_{sw} L}{v_c} \cdot \frac{P}{V_{dc}}} \right)$$

In the symmetric waveform control method, in the discharge period, the first switch S31 of the power ripple absorption circuit 130 is kept in the ON state, and accordingly, a current i$_{rec}$ flowing from the rectifier 110 to the DC/DC converter 120 is zero. Accordingly, in the symmetric waveform control method, in the discharge period, in order to make the output current from the alternating current power supply 200 a sine wave current, the control unit 140 controls the second switch of the power ripple absorption circuit 130 such that the value of the current i$_{bi}$ flowing from the alternating current power supply 200 via the second diode D32 and the third diode D33 to the inductor Lb of the power ripple absorption circuit 130 becomes as follows.

$$i_{bi}^* = \sqrt{2} \frac{P}{V_S} |\sin \omega_s t|$$

In order to make switching of the switches S21 to S28 of the DC/DC converter 120 soft-switching in the discharge period, the value of the current i$_L$ when switching from the mode 1 to the mode 2 (t=t$_1$) needs to be equal to or more than zero in the operating waveform i$_L$ of FIG. 8.

$$i_L(t_1) = \frac{(2\phi - \pi) v_C + \pi V_{dc}}{4\pi f_{SW}} \geq 0$$

Accordingly, in the discharge period, the switching frequency f$_{SW}$ of the DC/DC converter 120 may be set to satisfy the following expression.

$$f_{SW} \geq \frac{v_C - V_{dc}}{4L} \cdot \frac{V_{dc}}{P} \left( 1 - \frac{v_C - V_{dc}}{2v_C} \right)$$

In this way, in the discharge period, switching of the switches S21 to S28 of the DC/DC converter 120 becomes soft-switching, which improves the efficiency of the charger 100.

Figure 10:
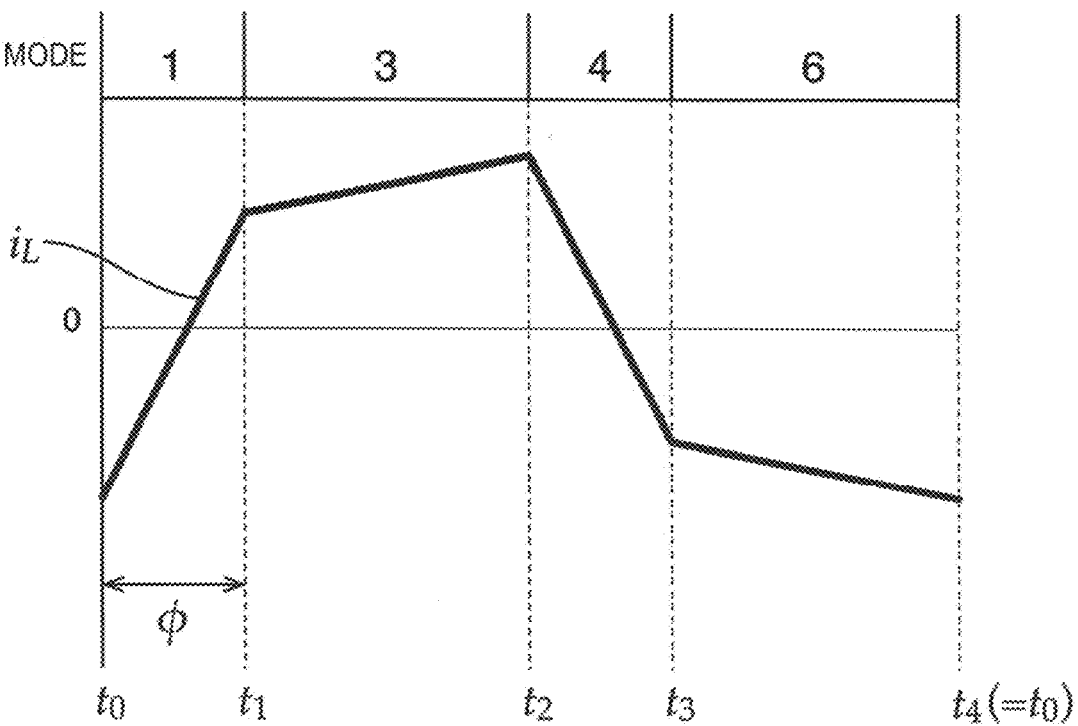
FIG. 10 is a diagram illustrating the operating waveform $i_L$ of the inductor L of the DC/DC converter 120 in a charge period (symmetric waveform control method).
Figure 11:
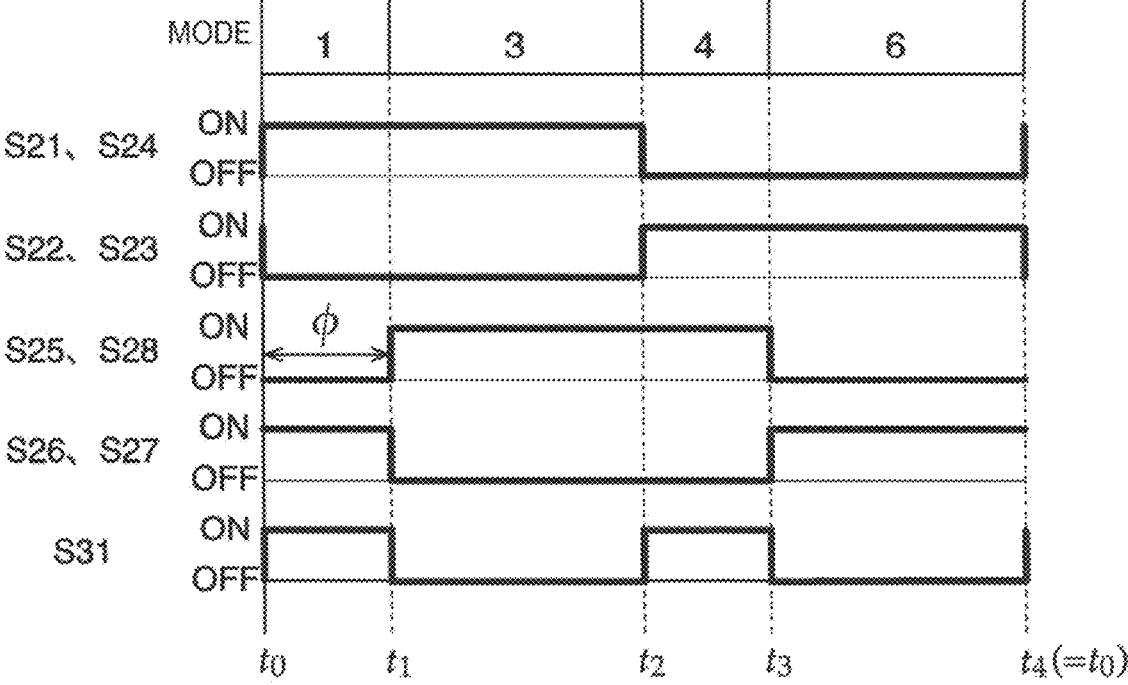
FIG. 11 is a diagram illustrating switching of switches S21 to S28 of the DC/DC converter 120 and the first switch S31 of the power ripple absorption circuit 130 in the charge period (symmetric waveform control method).

Furthermore, in the symmetric waveform control method, in the charge period, the control unit 140 may control switching of the switches S21 to S28 of the DC/DC converter 120 and the first switch S31 of the power ripple absorption circuit 130 such that the operating waveform i$_L$ of the inductor L of the DC/DC converter 120 becomes symmetric between positive and negative. FIG. 10 is a diagram illustrating the operating waveform i$_L$ of the inductor L of the DC/DC converter 120 in the charge period. The operating waveform i$_L$ can be obtained by switching four modes (modes 1, 3, 4, and 6) of the seven modes illustrated in FIG. 3 in the order of mode 1, mode 3, mode 4, and mode 6, as illustrated in FIG. 11. In the switching as illustrated in FIG. 11, the ON/OFF control of the switches S21 to S24 on the primary side and the ON/OFF control of the switches S25 to S28 on the secondary side of the DC/DC converter 120 are shifted by the phase shift angle φ, like the generally-available control method of the DAB converter.

Conversely to the discharge period, in the charge period, when control is performed to keep the first switch S31 of the power ripple absorption circuit 130 in the OFF state, the inclinations of the operating waveform i$_L$ becomes different between i$_L$<0 and i$_L$>0 in a period in which the switches S21, S24, S26, and S27 are in the ON state and the switches S22, S23, S25, and S28 are in the OFF state, i.e., the operating waveform i$_L$ is a waveform different from the operating waveform of the generally-available control method of the DAB converter. In a case where the switches S21, S24, S26, and S27 are in the ON state, the switches S22, S23, S25, and S28 are in the OFF state, and the first switch S31 of the power ripple absorption circuit 130 are in the OFF state, a current flows from the inductor L of the DC/DC converter 120 to the primary side of the DC/DC converter 120 while i$_L$<0, and this current flows into the buffer capacitor C$_{buf}$ of the power ripple absorption circuit 130 through the switch S21 of the DC/DC converter 120 and the body diode of the first switch S31 of the power ripple absorption circuit 130 even though the first switch S31 of the power ripple absorption circuit 130 is in the OFF state, so that the voltage v$_C$ of the buffer capacitor C$_{buf}$ is applied to the first terminal 121 and the second terminal 122 of the DC/DC converter 120. Conversely, in this case, while i$_L$>0, the buffer capacitor C$_{buf}$ of the power ripple absorption circuit 130 is separated from the circuit, a current output from the rectifier 110 flows from the primary side of the DC/DC converter 120 to the inductor L, not the voltage v$_C$ of the buffer capacitor C$_{buf}$ but the voltage v$_{rec}$ output from the rectifier 110 is applied to the first terminal 121 and the second terminal 122 of the DC/DC converter 120, and the inclination of the operating waveform i$_L$ changes from the inclination of the operating waveform i$_L$ where i$_L$<0. Likewise, when the first switch S31 of the power ripple absorption circuit 130 is kept in the OFF state in a period in which the switches S21, S24, S26, and S27 are in the OFF state and the switches S22, S23, S25, and S28 are in the ON state, the inclination of the operating waveform i$_L$ becomes different between i$_L$<0 and i$_L$>0.

Accordingly, in the switching as illustrated in FIG. 11, in a period in which the switches S21, S24, S26, and S27 are in the ON state and the switches S22, S23, S25, and S28 are in the OFF state and in a period in which the switches S21, S24, S26, and S27 are in the OFF state and the switches S22, S23, S25, and S28 are in the ON state, the first switch S31 of the power ripple absorption circuit 130 is controlled to the ON state, and in periods other than the above, the first switch S31 of the power ripple absorption circuit 130 is controlled to the OFF state. Accordingly, the inclination of the operating waveform $i_L$ becomes constant as illustrated in FIG. 10, in a period in which the switches S21, S24, S26, and S27 are in the ON state and the switches S22, S23, S25, and S28 are in the OFF state and in a period in which the switches S21, S24, S26, and S27 are in the OFF state and the switches S22, S23, S25, and S28 are in the ON state.

Accordingly, by performing switching as illustrated in FIG. 11, the operating waveform $i_L$ of the charge period also becomes similar in shape to the operating waveform of the generally-available control method of the DAB converter. Therefore, the transmission power P of the DC/DC converter 120 in the charge period can also be controlled by the phase shift angle φ, similar the generally-available control method of the DAB converter.

$$P = \frac{(v_C + v_{rec})V_{dc}}{4\pi f_{SW}L}\phi\left(1 - \frac{\phi}{\pi}\right)$$

By making the output current $Idc(=P/V_{dc})$ of the DC/DC converter 120 constant, the command value φ* of the phase shift angle φ in the charge period can be derived as follows.

$$\phi^* = \frac{\pi}{2}\left(1 - \sqrt{1 - \frac{16f_{sw}L}{v_C + v_{rec}}\cdot\frac{P}{V_{dc}}}\right)$$

In the symmetric waveform control method, in the charge period, the average of the current $i_{rec}$ flowing from the rectifier 110 to the DC/DC converter 120 in a single cycle of switching of the DC/DC converter 120 is as follows.

$$\overline{I_{rec}} = \frac{v_C - v_{rec} + 2V_{dc}}{4\pi f_{SW}L}\phi\left(1 - \frac{\phi}{\pi}\right)$$

Accordingly, in the symmetric waveform control method, in the charge period, in order to make the output current from the alternating current power supply 200 a sine wave current, the control unit 140 controls the second switch of the power ripple absorption circuit 130 such that the current $i_{bi}$ flowing from the alternating current power supply 200 via the second diode D32 and the third diode D33 to the inductor Lb of the power ripple absorption circuit 130 becomes as follows.

$$i_{bi}^* = \sqrt{2}\frac{P}{V_s}|\sin\omega_S t| - \overline{I_{rec}}$$

Also, in the charge period, in order to make switching of the switches S21 to S28 of the DC/DC converter 120 soft-switching, the value of the current $i_L$ when switching from the mode 1 to the mode 3 ($t=t_1$) needs to be equal to or more than zero in the operating waveform $i_L$ of FIG. 10 ($i_L(t_1)\geq0$). Accordingly, in the charge period, the switching frequency $f_{SW}$ of the DC/DC converter 120 may be set to satisfy the following expression.

$$f_{SW} \geq \frac{v_{rec} - V_{dc}}{4L}\cdot\frac{V_{dc}}{P}\left(1 - \frac{v_{rec} - V_{dc}}{v_{rec} + v_C}\right)$$

In this way, in the charge period, switching of the switches S21 to S28 of the DC/DC converter 120 becomes soft-switching, which improves the efficiency of the charger 100.

As described above, in the symmetric waveform control method, in the discharge period, the first switch S31 of the power ripple absorption circuit 130 is kept in the ON state. Accordingly, in the symmetric waveform control method, the number of times the first switch S31 is controlled to ON/OFF decreases, and as compared with the asymmetric waveform control method, the switching loss in the first switch S31 decreases, which improves the efficiency of the charger 100.

Figure 12:
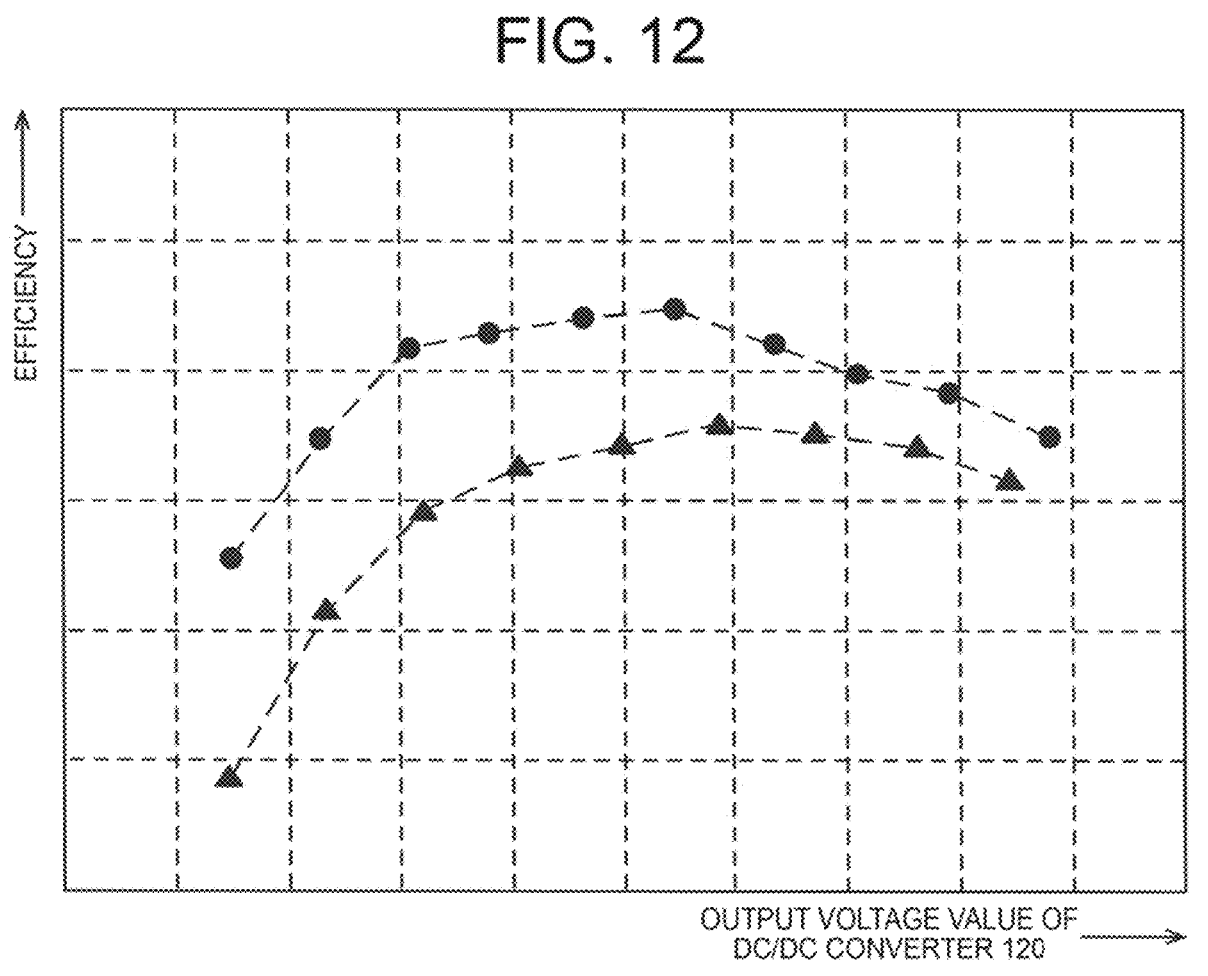

FIG. 12 is a diagram illustrating an example of the efficiency of the charger 100 when operated using the symmetric waveform control method and the efficiency of the charger 100 when operated using the asymmetric waveform control method. In FIG. 12, the vertical axis indicates the efficiency of the charger 100, the horizontal axis indicates the output power value of the DC/DC converter 120, a circle indicates the efficiency of the charger 100 when operated in the symmetric waveform control method, and a triangle indicates the efficiency of the charger 100 when operated in the asymmetric waveform control method. As illustrated in FIG. 12, in the symmetric waveform control method, the efficiency of the charger 100 improves as compared with the asymmetric waveform control method.

Although the present invention has been described herein with reference to specific examples, various modifications and changes can be made to these examples without departing from the spirit and scope of the invention as set forth in the claims.

LIST OF REFERENCE SIGNS 100 charger
110 rectifier
120 DC/DC converter
S21 to S28 switches of DC/DC converter
130 power ripple absorption circuit
D31 first diode
D32 second diode
D33 third diode
Lb inductor
$C_{buf}$ buffer capacitor
S31 first switch
S32 second switch
200 alternating current power supply
300 battery

What is claimed is:

1. A charger comprising:
a rectifier including two input terminals connecting to an alternating current power supply, a cathode terminal, and an anode terminal;
a DC/DC converter including a first terminal connecting to the cathode terminal of the rectifier via a first line, a second terminal connecting to the anode terminal of the rectifier via a second line, a third terminal connecting to a positive electrode of a battery, and a fourth terminal connecting a negative electrode of the battery;
a power ripple absorption circuit including a first diode, a second diode, a third diode, an inductor, a capacitor, a first switch, and a second switch; and
a control unit configured to control switching of switches of the DC/DC converter, the first switch, and the second switch, wherein the first diode is connected between the inductor of the power ripple absorption circuit and one of the two input terminals of the rectifier, the second diode is connected between the inductor and the other of the two input terminals of the rectifier, the capacitor and the first switch are connected in series between the first line and the second line, with the capacitor being disposed on a side of the second line, the third diode is connected between a line connecting the capacitor and the first switch and the inductor of the power ripple absorption circuit, the second switch is connected between a line connecting the inductor and the third diode of the power ripple absorption circuit and the second line, and wherein the control unit controls the DC/DC converter, the first switch, and the second switch such that a summation of a power output from the alternating current power supply and a power output from the capacitor becomes constant, and the control unit keeps the first switch in an ON state in a discharge period that is a period in which an instantaneous power output from the alternating current power supply is lower than an average power of the power output from the alternating current power supply.

2. The charger according to claim 1, wherein the control unit controls the switches of the DC/DC converter and the first switch such that a waveform of an inductor current that is a current flowing through an inductor on a primary side of a transformer of the DC/DC converter becomes symmetric between positive and negative.

3. The charger according to claim 2, wherein the switches of the DC/DC converter include:

on a primary side, a leg including a first switch arranged on a side of the first terminal and a second switch arranged on a side of the second terminal, and a leg including a third switch arranged on the side of the first terminal and a fourth switch arranged on the side of the second terminal; and on a secondary side, a leg including a fifth switch arranged on a side of the third terminal and a sixth switch arranged on a side of the fourth terminal, and a leg including a seventh switch arranged on the side of the third terminal and an eighth switch arranged on the side of the fourth terminal, control of switching of the DC/DC converter executed by the control unit in the discharge period includes:

a first mode in which the first switch, the fourth switch, the sixth switch, and the seventh switch of the DC/DC converter are ON, the second switch, the third switch, the fifth switch, and the eighth switch of the DC/DC converter are OFF, and the first switch of the power ripple absorption circuit is ON; and a second mode in which the first switch, the fourth switch, the fifth switch, and the eighth switch of the DC/DC converter are ON, the second switch, the third switch, the sixth switch, and the seventh switch of the DC/DC converter are OFF, and the first switch of the power ripple absorption circuit is ON, and the control unit controls a switching frequency of the DC/DC converter so that a value of the inductor current when switching from the first mode to the second mode becomes equal to or more than zero.

4. The charger according to claim 2, wherein, in the discharge period, the control unit controls the second switch of the power ripple absorption circuit such that a current flowing from the alternating current power supply to the inductor of the power ripple absorption circuit becomes a sine wave current.

5. The charger according to according to claim 1, wherein the switches of the DC/DC converter include:

on a primary side, a leg including a first switch arranged on a side of the first terminal and a second switch arranged on a side of the second terminal, and a leg including a third switch arranged on the side of the first terminal and a fourth switch arranged on the side of the second terminal; and on a secondary side, a leg including a fifth switch arranged on a side of the third terminal and a sixth switch arranged on a side of the fourth terminal, and a leg including a seventh switch arranged on the side of the third terminal and an eighth switch arranged on the side of the fourth terminal, wherein in a charge period that is a period in which the instantaneous power output from the alternating current power supply is higher than the average power of the power output from the alternating current power supply, the control unit turns ON the first switch of the power ripple absorption circuit in a first period that is a period in which the first switch, the fourth switch, the sixth switch, and the seventh switch of the DC/DC converter are ON and the second switch, the third switch, the fifth switch, and the eighth switch of the DC/DC converter are OFF, and in a second period that is a period in which the second switch, the third switch, the fifth switch, and the eighth switch of the DC/DC converter are ON and the first switch, the fourth switch, the sixth switch, and the seventh switch of the DC/DC converter are OFF, and to turn OFF the first switch of the power ripple absorption circuit in a period other than the first period and the second period.

6. The charger according to claim 5, wherein control of switching of the DC/DC converter executed by the control unit in the discharge period includes:

a first mode in which the first switch, the fourth switch, the sixth switch, and the seventh switch of the DC/DC converter are ON, the second switch, the third switch, the fifth switch, and the eighth switch of the DC/DC converter are OFF, and the first switch of the power ripple absorption circuit is ON; and a third mode in which the first switch, the fourth switch, the fifth switch, and the eighth switch of the DC/DC converter are ON, the second switch, the third switch, the sixth switch, and the seventh switch of the DC/DC converter are OFF, and the first switch of the power ripple absorption circuit is OFF, and the control unit controls a switching frequency of the DC/DC converter so that a value of the inductor current when switching from the first mode to the third mode becomes equal to or more than zero.

7. The charger according to claim 5, wherein, in the charge period, the control unit controls the second switch of the power ripple absorption circuit such that an output current flowing from the alternating current power supply becomes a sine wave current.

8. The charger according to claim 1, wherein the DC/DC converter is a DAB (Dual Active Bridge) converter.

9. A control method executed by a computer to control a charger, wherein the charger includes:

a rectifier including two input terminals connecting to an alternating current power supply, a cathode terminal, and an anode terminal;

a DC/DC converter including a first terminal connecting to the cathode terminal of the rectifier via a first line, a second terminal connecting to the anode terminal of the rectifier via a second line, a third terminal connecting to a positive electrode of a battery, and a fourth terminal connecting a negative electrode of the battery; and a power ripple absorption circuit including a first diode, a second diode, a third diode, an inductor, a capacitor, a first switch, and a second switch; and wherein the first diode is connected between the inductor of the power ripple absorption circuit and one of the two input terminals of the rectifier, the second diode is connected between the inductor and the other of the two input terminals of the rectifier, the capacitor and the first switch are connected in series between the first line and the second line, with the capacitor being disposed on a side of the second line, the third diode is connected between a line connecting the capacitor and the first switch and the inductor of the power ripple absorption circuit, the second switch is connected between a line connecting the inductor and the third diode of the power ripple absorption circuit and the second line, and wherein the control method includes:

controlling the DC/DC converter, the first switch, and the second switch such that a summation of a power output from the alternating current power supply and a power output from the capacitor becomes constant, and keeping the first switch in an ON state in a discharge period that is a period in which an instantaneous power output from the alternating current power supply is lower than an average power of the power output from the alternating current power supply.

10. A non-transitory computer-readable medium storing a control program for causing a computer to execute the control method according to claim 9.

\* \* \* \* \*